Mellen, Van Sandt & Palmer.
Imprt'd Sewing Machine Ruffler.
No. 102,294. Patented Apr. 26, 1870.
2 Sheets, Sheet 1
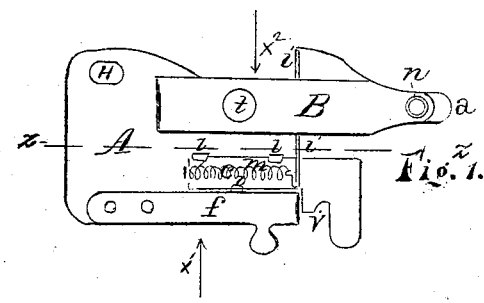
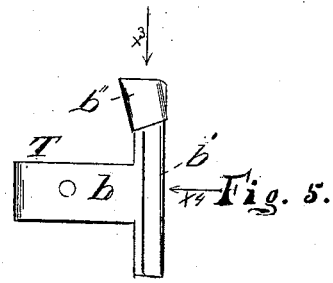
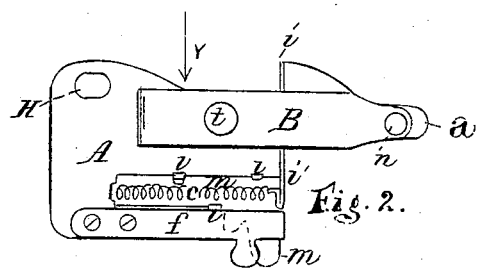
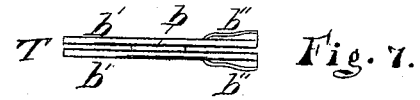
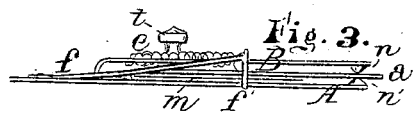
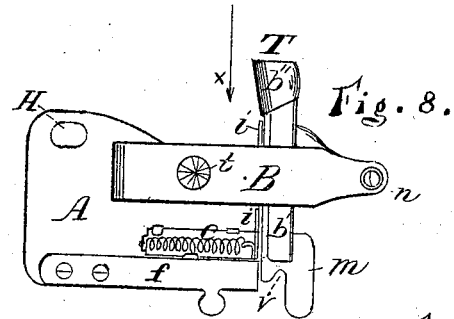
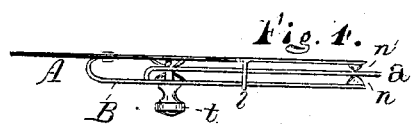
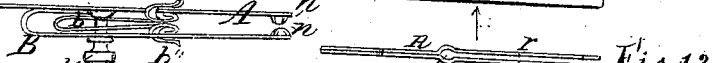
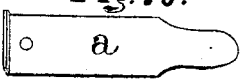
Witnesses:
Wm Nixon
M. W. Halsey
Inventors:
Joshua E. Mellen
Elisha Van Sandt
Milton J. Palmer Mellen, Van Sandt & Palmer.
Imt't'd Sewing Machine Ruffler.
No. 102,294. Patented Apr. 26, 1870.
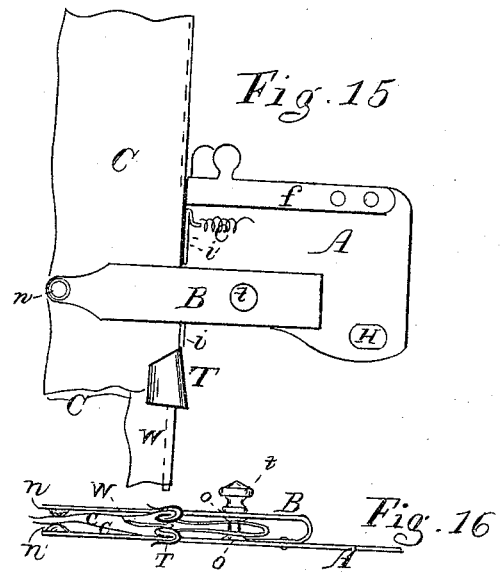
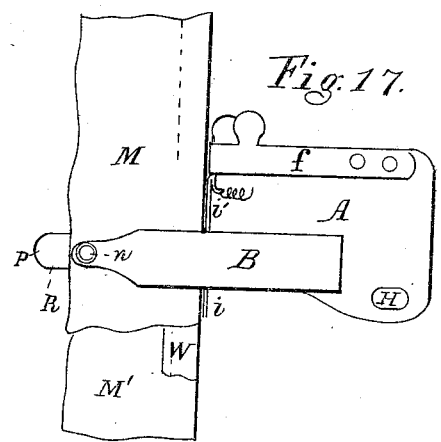
Witnesses:
Wm Nixon
M. N. Halsey
Inventors:
Joshua E. Mellen
Elisha Van Sandt
Milton J. Palmer

UNITED STATES PATENT OFFICE.

JOSHUA E. MELLEN AND ELISHA VAN SANDT, OF ADRIAN, MICHIGAN, AND MILTON J. PALMER, OF SYRACUSE, NEW YORK, ASSIGNORS, BY MESNE ASSIGNMENTS, TO WM. NIXON, ELISHA VAN SANDT, AND MILTON J. PALMER.

IMPROVEMENT IN ATTACHMENTS FOR SEWING-MACHINES.

Specification forming part of Letters Patent No. 102,294, dated April 26, 1870.

*To all whom it may concern:*

Be it known that we, JOSHUA E. MELLEN and ELISHA VAN SANDT, of Adrian, in the State of Michigan, and MILTON J. PALMER, of Syracuse, in the State of New York, have jointly invented a new and useful Combined Ruffling, Basting, Hemming, and Welting Attachment for Sewing-Machines, of which the following is a specification.

The subject of our invention is a gaging-guide of peculiar adaptation and interchangeable appliances for the same to adapt it for its several special uses named in the title.

The invention consists in certain constructions and combinations of parts hereinafter specifically set forth.

In the accompanying drawings, Figure 1 is a plan view of our attachment adjusted for ruffling or gathering. Fig. 2 is a similar view, the attachment being adjusted for basting. Fig. 3 is an elevation of the attachment under the adjustment represented in Fig. 1, viewed as indicated by the arrow $X'$. Fig. 4 is a longitudinal section on the line $z\ z$, Fig. 1, looking in the direction indicated by the arrow $X^2$. Figs. 5, 6, and 7 are detail views of the hemming appliance, Fig. 5 being a plan view and Figs. 6 and 7 edge views, taken from the points indicated by the arrows $X^3$ and $X^4$, respectively. Fig. 8 is a plan view of the attachment adjusted for hemming. Fig. 9 is a front edge view of the same with certain parts omitted. Fig. 10 is a perspective plan view of the ruffling and basting appliance. Fig. 11 is a plan view, and Fig. 12 an edge view, of the welting appliance. Fig. 13 is a front edge view of the attachment adjusted for welting and cording, certain parts being omitted. Fig. 14 is an edge view of a modified form of the welting appliance. Figs. 15, 16, and 17 are diagrams illustrating the operation of the attachment. Fig. 15 shows a plan view of the attachment adjusted for hemming, certain parts being omitted; Fig. 16, a front edge view of the attachment as represented in Fig. 15; and Fig. 17 a view, similar to Fig. 15, of the attachment adjusted for welting and cording.

Similar reference-letters indicate like parts in the several figures.

The parts omitted in Figs. 9, 13, and 16 are those marked $m$, $c$, and $i$ in Figs. 1 and 3. The two former are the parts omitted in Figs. 15 and 17.

A represents a base-plate of variable shape for supporting the various remaining parts of the device.

H represents a slot in said base-plate for the passage of an attaching set-screw.

$i\ i'$ represent the customary flange for gaging, which is formed on the base-plate A.

B represents a narrow spring-arm, arranged on the base-plate A, so as to project in front of the path of the needle when in working position, being attached to said plate at its inner end, and connected therewith intermediately by a clamp-screw, $t$.

The base-plate A is extended under the arm B, and the two form conjointly a clamp for holding the several appliances. The gaging-flange $i\ i'$ is discontinued at said arm.

The clamping-surfaces of the plate A and arm B may consist of protuberances $n\ n'\ o\ o'$, formed in pairs on their inner faces, as shown.

$m$ represents what we term a "presser-plate," for use in ruffling or gathering, which is permanently arranged on the base-plate A, in line with the path of the needle, projecting from the inner edge of the same over the feed-bar when in working position, as shown in Fig. 1, being recessed to accommodate the needle, and withdrawn within said plate, as represented in Fig. 2, when not required. A spring, $c$, may project the said plate $m$ automatically. A spring-catch, $f$, holds the same in its two positions. The lip $f'$ of said catch may be so arranged as to form a continuation of the gaging-flange $i\ i'$, as represented. The function of said presser-plate $m$ is to support the presser-foot, and thus relieve the lower piece of cloth from pressure sufficiently to permit the ruffling action, the upper piece of cloth being fed at proper relative speed by the thread.

$a$ represents a dividing plate or "tongue," constituting the ruffling and basting appliance. It consists of a thin plate, and may be of the general form represented in Fig. 10. It is employed in connection with the presser-plate $m$ for ruffling, and alone for basting work, its object being to separate the pieces to be sewed in this manner, and present them thus to the feed-bar and needle. It is shown applied in Figs. 1 and 4.

Our hemming appliance T consists of a pair of tapering folding-scrolls, $b'' b''$, arranged back to back, so as to turn inward, and corresponding contracted straight guides, $b' b'$, for conducting the folded edges to the needle, the whole attached to a perforated loop or double spring-stem, $b$, by which to hold it. Its shape is clearly represented in Figs. 5, 6, and 7, and it is shown applied in Figs. 8, 9, 15, and 16. It is employed to double hem or turn in and sew together two edges with or without an interposed welt, as illustrated in Figs. 15 and 16, where C C represent two thicknesses of cloth and W a welt being sewed between the turned edges. Such welt is introduced between the two folding-scrolls $b''$ and held by the guides $b'$, and does not require to be basted. The welt may be made at the same operation with a little care. Single hems or folds could be formed by it by using only one of the scrolls.

Our welting appliance R consists of a double strip, $r r'$, united at one end, as represented at $q$, slotted, as shown at 1, for the reception of the clamping-screw $t$, and bulged or expanded, as shown at $e$, a point intermediate between said slot and its outer end to accommodate a cord. Its form is shown in Figs. 11 and 12, and its application represented in Figs. 13 and 17. The extension of said welt-guide past its cord-aperture enables its support at both ends, as shown. The double form of the same renders it adjustable as to capacity. Its closed end $q$ may be opposite that of the form shown in Figs. 11 and 12, as represented in Fig. 14—i. e., the inner end—in which case its outer end might be used for inserting and removing the welts, and be expanded to facilitate this, as represented at $p p'$, Fig. 14. This appliance is used for making and introducing welts, corded or otherwise, or cording, as indicated in Fig. 17. (The hemming appliance, as used for welting, serves only to enable an edge-welt to be sewed in without basting.)

In all the described uses of the attachment except hemming the edge of the main piece or pieces being sewed is supposed to rest against the gaging-flange $i i'$, the position of which thus fixes the distance of the line of stitching from the edge. The elongated slot H permits the variation of the same as required. In hemming this means serves to adjust the turning-head with reference to the needle. The slot 1 in the welt-guide permits its independent adjustment relatively to the needle to enable the welt or cord to be laid at varying distances from the edge.

The welt-guide R of the forms shown may be employed instead of the dividing plate or tongue $a$ in ruffling, basting, &c., forming a long thin tongue which would serve for dividing as required, and said part be consequently dispensed with. The precise combination and arrangement shown and described may be otherwise departed from, as may also the details of construction of most of the parts.

The several parts of the attachment, except the clamping-screw $t$, may be made of suitable sheet metal and be nearly completely produced by stamping and punching. It will be seen by reference to the drawings, which represent the attachment constructed in this manner, that the amount of hand-work required would be very small.

Lips $l l$, struck up from the plate A at the operation of stamping the same, may form the guides and attachments of the presser-plate $m$, as arranged and employed in the manner described, or other means may be employed for the purpose.

The advantages claimed for our device over other means for the same uses are superior simplicity, compactness, and cheapness, with equal scope of variation and superior adaptation to different thicknesses of material.

We claim as new and of our invention—

1. In combination with the spring-arm B and clamp-screw $t$ for attaching different appliances, the presser-plate $m$, arranged in the base-plate A, and adapted to be held in a projected or withdrawn position, as required, by a spring-catch, $f$, substantially as shown, for the purposes specified.

2. The combination, in the hemming appliance T, of the pair of turning-scrolls $b'' b''$ and the corresponding guides, $b'$, formed and arranged substantially as represented and described, for the purposes shown.

3. The welt-guide R, formed from a single strip of sheet metal and provided with a cord-aperture, $e$, and an adjusting-slot, 1, substantially as represented and described.

4. The combination and arrangement of the slotted base-plate A and the described hemming appliance T, as and for the purpose shown.

5. The combination and arrangement of the slotted base-plate A, gaging-flange $i i'$, and the described adjustable welt-guide R, as and for the purposes set forth.

JOSHUA E. MELLEN.
ELISHA VAN SANDT.
MILTON J. PALMER.

Attest:
M. N. HALSEY,
M. E. STEWART.